United States Patent
Su et al.

(10) Patent No.: US 10,453,331 B2
(45) Date of Patent: Oct. 22, 2019

(54) DEVICE CONTROL METHOD AND APPARATUS

(71) Applicant: Beijing Xiaomi Mobile Software Co., Ltd., Haidian District, Beijing (CN)

(72) Inventors: Benchang Su, Beijing (CN); Sitai Gao, Beijing (CN); Enxing Hou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/693,008

(22) Filed: Aug. 31, 2017

(65) Prior Publication Data

US 2018/0068555 A1 Mar. 8, 2018

Related U.S. Application Data

(63) Continuation of application No. PCT/CN2016/097889, filed on Sep. 2, 2016.

(51) Int. Cl.
*G08C 17/00* (2006.01)
*H04N 5/44* (2011.01)
(Continued)

(52) U.S. Cl.
CPC ............ *G08C 17/00* (2013.01); *G08C 17/02* (2013.01); *G08C 23/04* (2013.01); *H04L 12/2818* (2013.01); *H04M 1/72533* (2013.01); *H04N 5/4403* (2013.01); *H04N 21/4131* (2013.01); *G08C 2200/00* (2013.01); *G08C 2201/21* (2013.01); *G08C 2201/40* (2013.01); *G08C 2201/92* (2013.01); *G08C 2201/93* (2013.01); *H04N 2005/4425* (2013.01);
(Continued)

(58) Field of Classification Search
None
See application file for complete search history.

(56) References Cited

U.S. PATENT DOCUMENTS

2004/0207535 A1* 10/2004 Stevenson .............. G08C 19/28
340/4.31
2014/0104091 A1 4/2014 Wang
(Continued)

FOREIGN PATENT DOCUMENTS

| CN | 1677941 A | 10/2005 |
|---|---|---|
| CN | 1747507 A | 3/2006 |

(Continued)

OTHER PUBLICATIONS

Partial European Search Report in connection with EP Application No. 17189011.4, dated Feb. 15, 2018, 14 pages.
(Continued)

*Primary Examiner* — Leon Viet Q Nguyen
(74) *Attorney, Agent, or Firm* — Arch & Lake LLP

(57) ABSTRACT

The present disclosure provides a device control method and apparatus, belonging to the field of smart home technology. The method includes: displaying a control key interface including a custom key; and when selection of the custom key is detected, sending a custom control message to a remote control device so that the remote control device transmits at least two control signals according to the custom control message to control at least one home device to perform at least two operations.

19 Claims, 7 Drawing Sheets

(51) Int. Cl.
*H04L 12/28* (2006.01)
*H04M 1/725* (2006.01)
*H04N 21/41* (2011.01)
*G08C 17/02* (2006.01)
*G08C 23/04* (2006.01)

(52) U.S. Cl.
CPC ............... *H04N 2005/4428* (2013.01); *H04N 2005/4433* (2013.01); *H04N 2005/4435* (2013.01); *H04N 2005/4439* (2013.01)

(56) References Cited

U.S. PATENT DOCUMENTS

| | | | |
|---|---|---|---|
| 2014/0121786 | A1 | 5/2014 | Chen |
| 2014/0267933 | A1* | 9/2014 | Young .............. H04N 21/42203 348/734 |
| 2015/0042892 | A1* | 2/2015 | McRae ................ H04N 5/4403 348/734 |
| 2017/0272266 | A1* | 9/2017 | Zhu ...................... H04N 21/422 |

FOREIGN PATENT DOCUMENTS

| | | | |
|---|---|---|---|
| CN | 101794501 | A | 8/2010 |
| CN | 102354190 | A | 2/2012 |
| CN | 103905871 | A | 7/2014 |
| CN | 105338083 | A | 2/2016 |
| EP | 2498234 | A1 | 9/2012 |
| EP | 2925004 | A1 | 9/2015 |
| JP | 2001275171 | A | 10/2001 |
| JP | 2006318329 | A | 11/2006 |
| JP | 2007258942 | A | 10/2007 |
| JP | 2016522609 | A | 7/2016 |
| WO | 2015154356 | A1 | 10/2015 |
| WO | 2016065760 | A1 | 5/2016 |
| WO | 2016126609 | A2 | 8/2016 |

OTHER PUBLICATIONS

Chinese Office Action dated Sep. 21, 2017 in CN Application No. 201680000820.8, 17 pages.
Chinese Notification to Grant Patent Right for Invention dated Jan. 30, 2018 in CN Application No. 201680000820.8, 5 pages.
Japanese Office Action issued in JP Patent Application No. 2017545920, dated Nov. 9, 2018, 5 pages.
Russian Office Action issued in RU Patent Application No. 2017130680, dated Dec. 14, 2018, 13 pages.
Notification of Reasons for Refusal (including English translation) issued in corresponding Chinese Application No. 2017-545920, dated Feb. 26, 2019, 9 pages.

* cited by examiner

DEVICE CONTROL METHOD AND APPARATUS

CROSS-REFERENCE TO RELATED APPLICATIONS

This application is based upon and claims priority to PCT Application PCT/CN2016/097889, filed Sep. 2, 2016, the entire contents of which are incorporated herein by reference.

TECHNICAL FIELD

The present disclosure relates to centralized control of devices, and more particularly, to device control methods and apparatuses for more efficiently performing multiple control operations for one or more devices.

BACKGROUND

With the rise in living standards, televisions (TVs), set-top boxes, air conditioners and other household equipment (home devices) have become an indispensable part of people's daily lives. In order to enable users to more easily control home devices, usually each home device is equipped with one remote control, and one home device is controlled through one remote control.

Taking the TV as an example, the process of controlling the TV through the remote control of the TV may be as follows: there are a turn-on (power on) key, a turn-off (power off) key, a program selection key and other keys on the remote control of the TV. When the turn-on key of the remote control is pressed, the remote control will launch an infrared signal indicating the turn-on of the TV, and after receiving the infrared signal, the TV performs the turn-on operation.

SUMMARY

The present disclosure provides example device control methods and apparatuses, and the technical solutions are illustrated as follows.

In example embodiments, a device control method may comprise: obtaining at least two control instructions associated with a custom control message, the at least two control instructions being configured to control at least one home device to perform at least two operations; accepting, via a control key interface, a selection of a custom key corresponding to the two or more operations; providing, in response to the selection of the custom key, the custom control message to a remote control device; and transmitting, via the remote control device, at least two control signals corresponding to the at least two control instructions associated with the custom control message to cause the at least one home device to perform, substantially simultaneously or in succession, at least two corresponding control operations in response to the received control signals.

In example embodiments, a device control method may comprise: displaying a control key interface, the control key interface comprising a custom key configured, when selected, to trigger a custom control message, the custom control message being used for indicating at least two control instructions associated with the custom key, and the at least two control instructions being configured to instruct at least one home device to perform at least two operations; and when selection of the custom key is detected, sending the custom control message to a remote control device to cause the remote control device to transmit at least two control signals corresponding to the at least two control instructions of the custom control message, the at least two control signals being configured to control the at least one home device to perform, substantially simultaneously or in succession, the at least two operations.

In example embodiments, a device control apparatus may comprise: a processor; and a memory for storing instructions executable by the processor; wherein the processor is configured to: obtain at least two control instructions corresponding to a custom control message, the at least two control instructions being configured to instruct at least one home device to perform two or more operations; and transmit, in response to selection of a custom key, at least two control signals corresponding to the at least two control instructions to cause each of the at least one home device to perform, substantially simultaneously or in succession, two or more corresponding control operations corresponding to the received control signals.

In example embodiments, a device control apparatus may comprise: a processor; and a memory for storing instructions executable by the processor; wherein the processor is configured to: display a control key interface, the control key interface comprising at least a custom key for triggering a custom control message, the custom control message being used for indicating at least two control instructions associated with the custom key, and the at least two control instructions corresponding to at least one home device; and when selection of a custom key is detected, send the custom control message to a remote control device so that the remote control device transmits at least two control signals according to the custom control message to control the at least one home device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain principles of the invention.

DETAILED DESCRIPTION

To make the objectives, technical solutions and advantages of the present disclosure more clear, the embodiments of the present disclosure will be further described in detail with reference to the accompanying drawings.

Reference will now be made in detail to exemplary embodiments, example implementations of which are illustrated in the accompanying drawings. The following description refers to the accompanying drawings in which the same numbers in different drawings represent the same or similar elements unless otherwise stated. The implementations set forth in the following description of exemplary embodiments do not represent all implementations consistent with the invention. Instead, they are merely examples of apparatuses and methods consistent with aspects related to the invention as recited in the appended claims.

Figure 1:
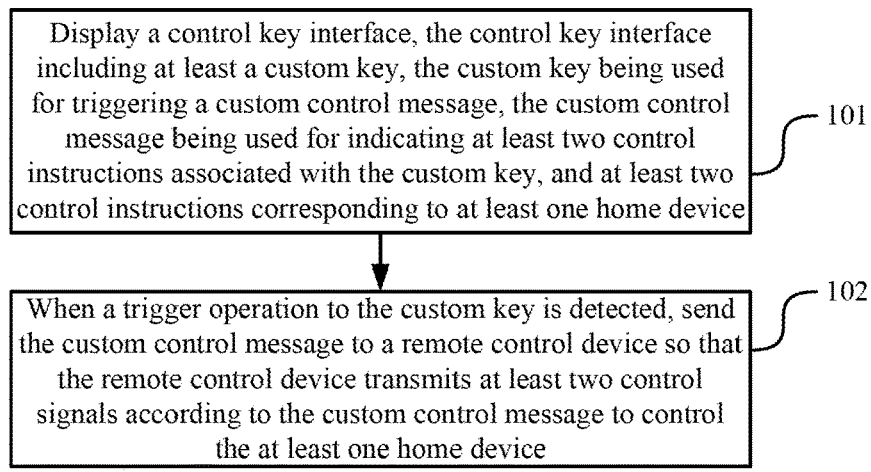
FIG. 1 is a flow chart of an example device control method according to one or more exemplary embodiments.

FIG. 1 is a flow chart of an example device control method according to an exemplary embodiment. As shown in FIG. 1, the method is applied in a terminal, and includes the following steps.

In step 101, a control key interface is displayed. The control key interface includes at least a custom key. The custom key may be used for triggering a custom control message. The custom control message may be used for indicating at least two control instructions associated with the custom key, and at least two control instructions corresponding to at least one home device to perform at least two operations.

In step 102, when selection of the custom key is detected (e.g., when a user selects the custom key or the custom key is otherwise triggered), the custom control message is sent to a remote control device so that the remote control device transmits at least two control signals according to the custom control message to control the at least one home device.

Through the method provided by one embodiment of the present disclosure, one key is associated with at least two control instructions of at least one home device and, in this way, the home device can perform a plurality of operations by only operating one key by the user. When at least two control instructions correspond to different home devices respectively, a joint control to multiple home devices is achieved through one key, which simplifies the operation steps. Example combinations of operations for one home device include, for example: powering on and setting the channel to a particular channel or launching a particular application (for example, for a TV or set-top box); switching channels in a specified sequence or according to a specified ruleset (to scan television channels or seek a channel with particular programs or particular program genres, for example); powering on and setting a temperature to a particular temperature (for example, for an air conditioning system); powering on lighting and adjusting lighting level to a certain level (for example, to achieve a desired ambience); powering on and, after a specified delay, powering off, etc. Example operations for two or more home devices include, for example: powering on a TV and setting the temperature of an air conditioner to a specified temperature; setting the temperature of an air conditioner to a particular temperature and powering on particular lights at maximum (or other) levels; starting a program (e.g., by playing a disc in a disc player) and powering up/down/on/off the lights or otherwise changing the lighting level in a particular room (to, for example, begin a movie or TV show and dim the lights in a home theatre room for a relatively darker movie viewing environment), etc.

In one possible implementation, before selection of the custom key is detected, the method may include the following steps.

For example, when a custom operation (to allow a user to, for example, customize which control operations are associated with the custom key) to the custom key (implemented using, for example, touchscreen prompts or other input means) is detected, control options available for the custom operation (i.e., user-customized operation) of at least one home device may be displayed, where each control option corresponds with one or more operations of the at least one home device. This may initiate a step of determining at least two control instructions corresponding to at least two control options selected from among the available control options available for the custom operation of the at least one home device to then associate the at least two control instructions with the custom key. In one possible implementation, the custom control message contains the at least two control instructions.

In one possible implementation, before selection of the custom key is detected, the method may include the following.

For example, when a custom operation to the custom key is detected, control options available for the custom operation of the at least one home device may be displayed. Then, the device may determine at least two control instructions corresponding to at least two control options selected from among the available control options available for custom operation of the at least one home device. Then, the device may generate an instruction set identifier (such as a unique code) for the at least two control instructions and associate the instruction set identifier with the custom key.

In one possible implementation, the custom control message contains the instruction set identifier, and the sending the custom control message to the remote control device may include the following. For example, sending the instruction set identifier to the remote control device such that the remote control device obtains the at least two control instructions corresponding to the instruction set identifier from a stored preset instruction list to control the at least one home device. The preset instruction list may be used to store an instruction set identifier and one or more corresponding control instructions.

In one possible implementation, after associating the instruction set identifier with the custom key, the method may include the following. For example, generating a setting instruction of the control instruction, where the setting instruction at least includes the at least two control instructions and the instruction set identifier. Then, the method may include sending the setting instruction to the remote control device so that the remote control device stores the at least two control instructions and the instruction set identifier in the preset instruction list correspondingly.

In one possible implementation, there is a preset order for the at least two control instructions. The preset order may indicate which control instruction (corresponding to, for example, an operation of a home device) is to be sent first by the remote control device before a second control instruction, followed by a third control instruction, etc. (i.e., a sequence for the control instructions). The preset order may also specify time (pauses/delays) between instructions (from zero to any desired time), such as a first control instruction followed 15 seconds later by a second control instruction, which is followed 10 seconds later by a third control instruction, which is followed one minute later by fourth and fifth control instructions substantially simultaneously (i.e., without imposing delay/waiting between the fourth and fifth control instructions); in this example, the sequence is instruction 1, pause 1, instruction 2, pause 2, instruction 3, pause 3, instruction 4, pause 4, and instruction 5, with pauses 1 through 4 being 15 seconds, 10 seconds, one minute, and zero seconds, respectively.

In one possible implementation, before determining the at least two control instructions corresponding to the at least two control options selected by the user from the displayed control options. The method may further include the following. For example, obtaining a control instruction library for each of the at least one home device from a server. The control instruction library may be used for storing a plurality of (available/potential) control instructions for the home device, and each of the plurality of control instructions may correspond to one control option (e.g., one or more operations) of the home device.

All the alternative embodiments described above may be combined in any way to form alternative embodiments of the present disclosure, which will not be described one by one herein.

Figure 2:
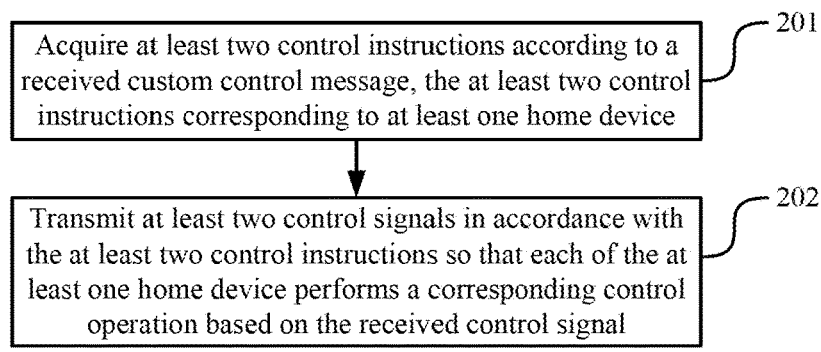
FIG. 2 is a flow chart of an example device control method according to one or more exemplary embodiments.

FIG. 2 is a flow chart of an example device control method according to an exemplary embodiment. As shown in FIG. 2, the method is applied in a remote control device, and includes the following steps.

In step 201, at least two control instructions are acquired according to a received custom control message, the at least two control instructions corresponding to at least one home device.

In step 202, at least two control signals are transmitted in accordance with the at least two control instructions so that each of the at least one home device performs a corresponding control operation based on the received control signal. The control signals may be transmitted by the remote control device wirelessly via, for example, infrared, acoustic, or other signals, and/or via signals sent through network wires.

Through the method provided by the embodiment of the present disclosure, one key is associated with at least two control instructions of at least one home device. In this way, the home device can perform a plurality of operations by only operating one key by the user. When at least two control instructions correspond to different home devices respectively, a joint control (via, e.g., two or more control signals being sent by the remote control device) to multiple home devices is achieved through one key, which simplifies the operation steps.

In one possible implementation manner, the step of obtaining at least two control instructions based on the received custom control message may include the following.

For example, obtaining the at least two control instructions from the custom control message.

In one possible implementation, the step of obtaining at least two control instructions based on the received custom control message may include the following.

For example, an instruction set identifier may be obtained from the custom control message and at least two control instructions corresponding to the instruction set identifier may be obtained from a stored preset instruction list, where the preset instruction list is used for storing an instruction identifier and one or more corresponding control instructions.

In one possible implementation, before obtaining at least two control instructions according to the received custom control message, the method may further include the following.

For example, a setting instruction of the control instruction of a terminal may be received, where the setting instruction at least includes the at least two control instructions and the instruction set identifier. Then, the at least two control instructions and the instruction set identifier may be stored in the preset instruction list correspondingly.

In one possible implementation, the at least two control instructions have a preset order for the operations to be performed by the one or more home devices.

All the alternative embodiments described above may be combined in any way to form alternative embodiments of the present disclosure, which will not be described one by one herein.

Figure 3:
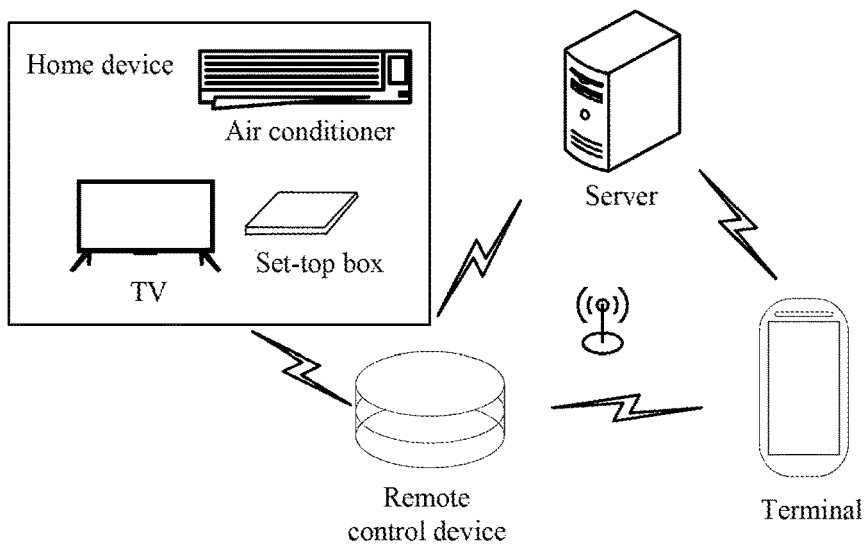
FIG. 3 is an example system architecture diagram for device control according to one or more exemplary embodiments.

FIG. 3 is an example system architecture diagram for device control according to an exemplary embodiment. As shown in FIG. 3, the system includes a terminal, a server, a remote control device, and one or more home devices. The home devices may include a TV, a set-top box, an air conditioner, an electric fan, a humidifier, lights, or other equipment.

An indirect connection may be established between the terminal and remote control device. That is, a connection may be established between the terminal and the server, and between the server and remote control device respectively through, for example, WiFi (Wireless Fidelity) or other communications means. In addition, the terminal may also establish a direct connection with the remote control device, such as the establishment of a Bluetooth or other connection.

The server stores control instruction libraries for one or more home devices, and identifiers of the home devices and the control instruction libraries may be stored correspondingly by the server. The identifier of the home device may be represented by, for example, a model of the home device, or may be represented by a brand and a model of the home device, and the present disclosure is not particularly limited thereto.

After establishing the connection with the remote control device, the terminal may add an operation corresponding to one or more devices of the user, add the identifier(s) of one or more home devices selected by the user from a device control list, obtain the control instruction library corresponding to the identifier of the home device from the server, and store the control instruction library and the identifier of the home device correspondingly. The control instruction library contains a plurality of control instructions for controlling the home device. The terminal may control the home device according to the acquired control instruction library. The device control list may include one or more identifiers of the home device, and for each identifier of the home device, the terminal may obtain a corresponding control instruction library from the server to control one or more home devices.

The terminal controls the home device (or home devices) through the remote control device. For example, the terminal may display a control key interface for the one or more home devices. The control key interface includes a plurality of control keys for controlling the home devices. In embodiments of the present disclosure, one control key may be associated with one or more control instructions. When the control key is associated with a plurality of control instructions, the plurality of control instructions may correspond to one or more operations of one or more home devices. When one control key is associated with a plurality of control instructions of one home device, it is possible to perform a plurality of control operations on the home device by selecting the one key. When selection of any control key in the control key interface is detected, the terminal sends at least one control instruction associated with the control key to the remote control device. The remote control device transmits at least one control signal according to the received at least one control instruction, to make the at least one home device perform the control operation corresponding to the received control signal. The specific process of controlling at least one home device by associating one control key with a plurality of control instructions may be found in, for example, the embodiments shown in FIGS. 4 and 5 described below.

It is to be noted that contents of the control instruction may be determined in accordance with a control mode of the home device in practice (i.e., as required for control of different home devices). For example, when the home device is a device having an infrared function, the control instruction may be an infrared control instruction, and the infrared control instruction may include an infrared code, a carrier frequency of the infrared code, header information of the infrared code and the like. In the case where the infrared code is expressed by binary, the content of the infrared code may be, for example, "01001011" or the like. Correspondingly, the remote control device has an infrared signal transmission function, and may transmit an infrared signal according to the infrared code. Moreover, the remote control device may transmit the infrared signal in a plurality of directions so that irrespective of which direction the home device is located with respect to the remote control device, the home device can receive the infrared signal and perform the control operation corresponding to the received infrared signal.

It should be noted that, in order to improve the security of the device control, the terminal may also be bound (paired) with the remote control device. In one possible implementation, the terminal may log into a user account, and bind the user account to a device identifier of the remote control device so that the remote control device responds only to the control instructions sent by the terminal which the user account corresponds to or is associated with. That is, only when the control instruction of the terminal in which the user account is located is received, the corresponding control signal is transmitted, and thus the home device may be more securely controlled. The binding relationship may be established during the connection between the terminal and the remote control device, or after the user purchases the remote control device by using the user account, the server binds the user account to the device identifier of the remote control device. The embodiments of the present disclosure are not limited thereto.

In practice, the associating one control key with multiple control instructions of at least one home device may involve the following two scenarios in certain embodiments. In the first application scenario, the user has a fixed usage habit of the home device (e.g., a routine for how the user operates the home device). For example, the user is accustomed to watching a certain TV program, and at this time, a plurality of control instructions associated with one control key may be used to control multiple operations of one home device. In the second application scenario, some home devices need to be used cooperatively in order to achieve the purpose of use. For example, the TV is used along with the set-top box, so as to watch the television programs. Alternatively, sometimes the user is used to turning on a number of home devices successively, for example, the user is used to turning on the TV, the air conditioner, and etc. after going home. At this point, multiple control instructions associated with one control key may be used for controlling multiple home devices. The detailed procedure is shown in the embodiment shown in FIGS. 4 and 5.

Figure 4:
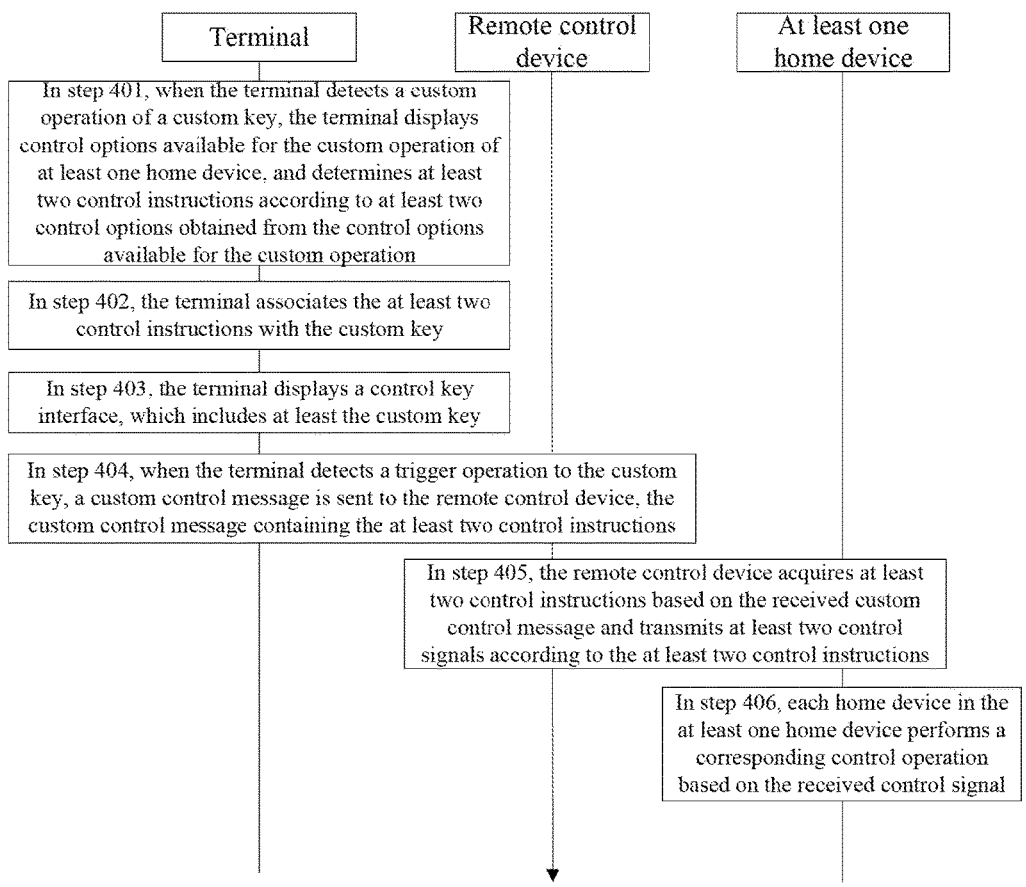
FIG. 4 is a flow chart of an example device control method according to one or more exemplary embodiments.

FIG. 4 is a flow chart of an example device control method shown in accordance with an exemplary embodiment. As shown in FIG. 4, interaction subjects are a terminal, a remote control device and at least one home device, and the method includes the following steps.

In step 401, when the terminal detects a custom operation of a custom key (e.g., a selection via a terminal to customize the operations corresponding to the custom key), the terminal displays control options available for the custom operation of the at least one home device, and determines at least two control instructions according to at least two control options obtained from the control options available for the custom operation.

The custom operation of the custom key refers to an operation for the definition or customization of the custom key. The custom key may be an original control key of at least one home device or a newly generated control key, and the present disclosure is not limited thereto.

The terminal may obtain a control instruction library of the home device from the server in the procedure of adding the home device or after the home device is added. The control instruction library is used for storing a plurality of control instructions for the home device. For any home device, the terminal, after acquiring the control instruction library of the home device, generates one control option for each control instruction in the control instruction library, that is, each control instruction in the control instruction library corresponds to one control option (e.g., a set of one or more operations) of the home device.

In order to provide a flexible way of key setting to meet the actual needs of the user, a custom function of the key may be provided for the user. For example, when the terminal detects a custom operation to a custom key, it is possible to display control options adapted for the custom operation of at least one home device. The user may select a plurality of control options from the displayed control options, and the terminal obtains at least two control options according to a plurality of control options selected by the user to determine at least two control instructions corresponding to the at least two control options. The terminal may display the control options through the custom interface of the key. The control options of all the home devices to be added by the terminal may be displayed in the custom interface at the same time. Alternatively, it is also possible to display all the identifiers of the home devices in the custom interface of the key at first, and when the terminal detects a selection operation to any identifier of the home device, the control options corresponding to the selected home device are displayed. The display mode of the control options of the home device is not limited by the embodiments of the present disclosure.

The control options adapted for the custom operation of at least one home device may be control options corresponding to all control instructions of at least one home device. To display the control options in a more targeted way, the control options adapted for the custom operation of at least one home device may also be control options corresponding to partial control instructions of (i.e., a subset of all control options for) at least one home device. The control options corresponding to the partial control instructions may be the control options commonly used by the user, which may be screened by the terminal according to a preset algorithm, or may be pre-set by the user. The present disclosure is not limited thereto.

It is to be noted that the user may select at least two control options from the presented control options. The terminal may determine at least two control instructions according to at least two control options selected by the user so that the custom key may correspond to a plurality of control instructions. If the at least two control options selected by the user are control options for the same home device, then the corresponding at least two control instructions also correspond to the same home device. If the at least two control options selected by the user are control options for different home devices, then the corresponding at least two control instructions correspond to different home devices.

In step 402, the terminal associates the at least two control instructions with the custom key.

The terminal may store the key identifier of the custom key corresponding to the at least two control instructions. The key identifier of the custom key may be automatically generated by the terminal, or may be set or modified by the user, and the present disclosure is not limited thereto.

In one embodiment, when the at least two control instructions correspond to one home device, a plurality of operations of one home device may be controlled by the custom key. For example, if both a turn-on control instruction of the TV and a resource list opening control instruction of the TV are associated with the custom key, it is possible to control the TV to be turned on and open the resource list by using the custom key.

In another embodiment, when the at least two control instructions correspond to a plurality of home devices, the plurality of home devices may be jointly controlled by the custom key. For example, both a turn-on control instruction of the TV and a turn-on control instruction of the set-top box are associated with the custom key, then it is possible to use the custom key to jointly control the TV and set-top box.

In step 403, the terminal displays a control key interface, which includes at least the custom key.

When the custom key is the original control key of a certain home device, the custom key may be displayed in the control key interface of this home device. When the custom key is a newly generated control key, it is possible to add the custom key to a control key interface of any associated home device, or add the custom key to a control key interface different from the control key interface of any home device. When the user needs to use the custom key to control one or more home devices, he/she may open the control key interface at any time through the terminal.

In order to distinguish the custom key associated with a plurality of control instructions from other control keys each of which is associated with only one control instruction, a custom mark may be set for an icon of the custom key so that the control key with the custom mark is the custom key that is associated with multiple control instructions. The custom mark may be a color mark, a shape mark (for example, the original key is square, and the custom key is circular), and etc., which is not particularly limited by the embodiments of the present disclosure.

In step 404, when the terminal detects a selection of the custom key, a custom control message is sent to the remote control device, the custom control message containing the at least two control instructions.

When the terminal detects selection of the custom key, a custom control message is generated and the custom control message is sent to the remote control device via a connection established with the remote control device. That is, at least two control instructions contained in the custom control message are sent to the remote control device. In this step, the terminal may include the at least two control instructions in the custom control message and send them to the remote control device. Or in another embodiment, the terminal may include the at least two control instructions in different custom control messages so as to be sent to the remote control device, which is not limited by the embodiments of the present disclosure.

In another embodiment, in order to more clearly indicate to the remote control device how to transmit a control signal in accordance with the at least two control instructions, the terminal may further set a sequence of the at least two control instructions in advance so that the at least two control instructions have a preset order. The terminal may carry an instruction sequence number of each control instruction in the custom control message to indicate the preset sequence so that the remote control device transmits the control signal in accordance with the instruction sequence number of each control instruction. The terminal may set the selection order of the control options of the at least two home devices by the user in the step 401 to be the preset order, or the terminal sets the preset order by other algorithms, which is not particularly limited by the embodiments of the present disclosure.

In step 405, the remote control device acquires at least two control instructions based on the received custom control message and transmits at least two control signals according to the at least two control instructions.

In the embodiments of the present disclosure, the remote control device has a control signal transmitting function. In order to ensure that at least two home devices are able to receive the control signals, the remote control device may transmit the control signals in multiple directions so that, irrespective of which direction the home device is with respect to the remote control device, the infrared signal can be received and the control operation can be performed according to the received infrared signal. In a specific implementation, when at least two home devices are the devices having the infrared function, it is possible to provide one infrared emission head along each of multiple directions within the remote control device, or an infrared transmitter which may transmit in multiple directions is provided, such that the remote control device may transmit the control signal in multiple directions.

After obtaining the at least two control instructions from the custom control message, the remote control device generates one control signal for the content of each control instruction, and transmits each control signal. For example, when the control instruction is an infrared control instruction, it is possible to acquire the infrared code, the carrier frequency of the infrared code, and the like included in the infrared control instruction, and the remote control device may generate and transmit the infrared control signal by modulating the infrared code to the carrier frequency of the infrared code.

If the at least two control instructions have a preset order, the process of transmitting the control signal by the remote control device may be as follows in example implementations: generating a control signal for each control instruction in accordance with the preset order of control instructions, and transmitting the control signal of each control instruction. For example, when the custom control message carries the instruction sequence number of each control instruction, the remote control device may determine the preset order of each control instruction according to the instruction sequence number. The remote control device may transmit each control signal in sequence according to the preset order after generating at least two control signals according to the preset order. Or the remote control device may transmit one control signal after generating one control signal in accordance with the preset order, and then transmit a next control signal immediately after generating the next control signal, and so on, to complete the transmission procedure of at least two control signals.

In step 406, each home device in the at least one home device performs a corresponding control operation based on the received control signal.

The above-mentioned at least one home device has a control signal receiving function. For any of the home devices, after receiving the control signal matching with itself (i.e., applicable thereto), the home device executes the control operation indicated by the control signal. For example, when receiving the turn-on control signal of the TV, the TV performs a power-on operation.

In another embodiment, the remote control device may also obtain from the server a control instruction library of the home device added by the terminal. In addition to storage of the control instructions of the home device, the control instruction library also stores instruction identifiers corresponding to individual control instructions. The process of controlling the home device in each of the steps shown in FIG. 4 may also be as follows in certain example implementations.

The control instruction library of the home device acquired by the terminal from the server in step 401 may also include an instruction identifier of each control instruction. In step 402, the terminal may store the key identifier of the custom key corresponding to the instruction identifiers of the at least two control instructions to implement the association of the at least two control instructions with the custom key. In step 404, the custom control message contains the instruction identifier of each control instruction in the at least two control instructions. In step 405, the remote control device acquires at least two instruction identifiers according to the received custom control message, and obtains at least two control instructions corresponding to the at least two instruction identifiers from the locally stored control instruction library according to the at least two instruction identifiers. Thereafter, the remote control device transmits at least two control signals in accordance with the at least two control instructions, thereby achieving control of the home device.

Hereinafter, illustrations will be given by using the condition in which the terminal performs a combination control (joint control) on a plurality of home devices by using one key in FIG. 4. For example, the explanations will be given by taking the condition in which the terminal performs a combination control on the TV and the set-top box using one key as an example.

For example, in the case that the custom key is associated with the power-on control instruction of the TV and the power-on control instruction of the set-top box, when the user clicks or taps the custom key, the terminal sends the power-on control instruction of the TV and the power-on control instruction of the set-top box to the remote control device. The remote control device transmits a power-on control signal of the TV and a power-on control signal of the set-top box respectively corresponding to the two control instructions, such that the TV performs the power-on operation after receiving the power-on control signal of the TV, and the set-top box performs the power-on operation after receiving the power-on control signal of the set-top box, thereby achieving the purpose of turning on the TV and the set-top box by one key, and simplifying the operation steps of controlling multiple home devices.

The method provided by the embodiments of the present disclosure associates one key with at least two control instructions of the home device so that the user can perform a plurality of operations on the home device by operating only one key, and when the at least two control instructions correspond to different home devices respectively, the joint control to multiple home devices by one key is achieved, and the operation steps are simplified.

The embodiment shown in FIG. 4 is a process in which the terminal directly sends at least two control instructions associated with the custom key to the remote control device according to the user's selection of the custom key (e.g., using a touchscreen of the terminal or other input means) to control the home device. In order to improve the flexibility of control of multiple home devices, the terminal may also pre-configure the association relationship between the custom key and at least two control instructions to the remote control device, so that the control of a plurality of home devices may be achieved without sending the specific contents of the control instructions by the terminal each time. The detailed procedure may be referred to the embodiment shown in FIG. 5.

Figure 5:
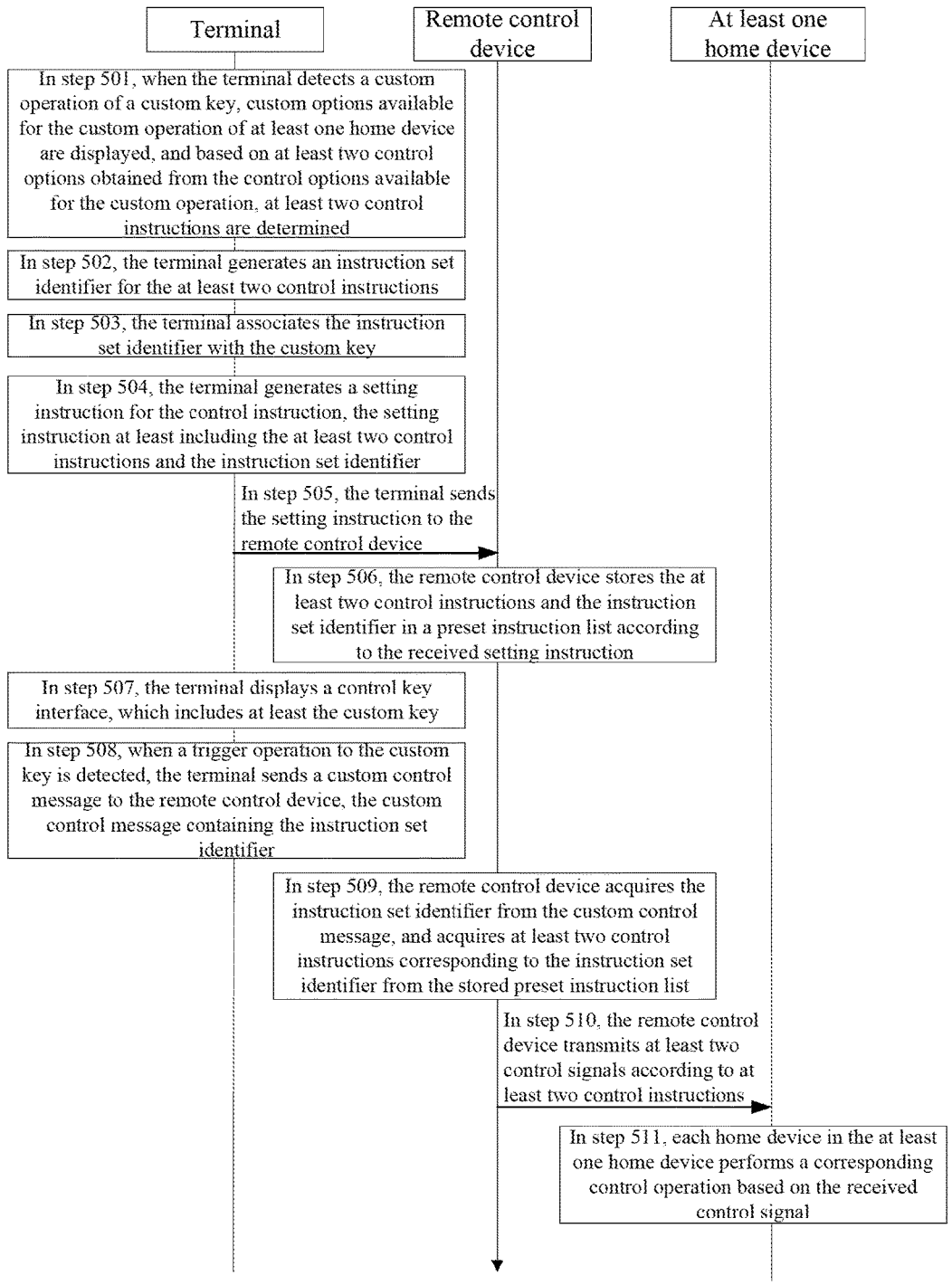
FIG. 5 is a flow chart of an example device control method according to one or more exemplary embodiments.

FIG. 5 is a flow chart of an example device control method shown in accordance with an exemplary embodiment. As shown in FIG. 5, the interaction subjects are a terminal, a remote control device and at least two home appliances, and the method includes the following steps.

In step 501, when the terminal detects a custom operation of a custom key, custom options available for the custom operation of at least one home device are displayed, and based on at least two control options obtained from the control options available for the custom operation, at least two control instructions are determined.

This step is the same as the above-mentioned step 401, and will not be described here further.

In step 502, the terminal generates an instruction set identifier for the at least two control instructions.

In order to uniformly identify the at least two control instructions, the terminal may treat the at least two control instructions as one instruction set and generate an instruction set identifier for the at least two control instructions so that each control instruction in the instruction set corresponds to the same instruction set identifier. The instruction set identifier may be automatically generated by the terminal according to a preset algorithm, or may be set or modified by the user, and the present disclosure is not particularly limited thereto.

In step 503, the terminal associates the instruction set identifier with the custom key.

In the process of generating the custom key, the terminal may associate the key identifier of the custom key with the instruction set identifier so that the custom key is indirectly associated with the at least two control instructions. In one possible implementation, the terminal may store the key identifier of the custom key corresponding to the instruction set identifier to indicate the association relationship between the custom key and the instruction set identifier. The key identifier of the custom key may be automatically generated by the terminal, or may be set or modified by the user. The present disclosure is not particularly limited thereto.

The custom operation of the custom key refers to an operation for the definition or customization of the custom key. The custom key may be an original control key of at least one home device or a newly generated control key, and the present disclosure is not limited thereto.

In step 504, the terminal generates a setting instruction for the control instruction, the setting instruction at least including the at least two control instructions and the instruction set identifier.

The terminal may configure the association relationship between the custom key and the at least two control instructions in the remote control device. For example, for each control instruction, the terminal may include the control instruction and its corresponding instruction set identifier in one setting instruction and send it to the remote control device. Or the terminal may include the at least two control instructions together with the instruction set identifier in one setting instruction, the present disclosure is not particularly limited thereto. In addition, the setting instruction may also carry a setting instruction identifier so that the remote control device may recognize the setting process of executing the control instruction according to the setting instruction identifier.

For example, when the control instruction is an infrared control instruction, the setting instruction for each control instruction may be expressed, for example, in the following manner:

{"method": "set_ir_seq", "params":{"seq_id": "123456", "freq": "xxx", "head": "xxx", "code": "xxxx"}} wherein "set_ir_seq" indicates the setting instruction identifier, "seq_id" indicates the instruction set identifier, "freq" indicates the carrier frequency of the infrared code, "head" indicates header information of the infrared code, and "code" indicates the infrared code. "xxx" and "xxxx" represent specific contents, which is determined by specific contents of the infrared code. In the embodiments of the present disclosure, the format of the setting instruction is described by only using "x" to represent any contents, and the specific contents thereof are not limited.

In step 505, the terminal sends the setting instruction to the remote control device.

The terminal sends a setting instruction to the remote control device via a connection established with the remote control device. In step 504, the terminal may generate one setting instruction for each control instruction, that is, generate at least two setting instructions. Or the terminal may uniformly generate one setting instruction for at least two control instructions. Therefore, the corresponding terminal may sequentially send the at least two setting instructions to the remote control device, or may directly transmit one unified setting instruction. The present disclosure is not particularly limited thereto.

In another embodiment, in order to more clearly indicate to the remote control device how to transmit a control signal based on the at least two control instructions, the terminal may also configure the order of the at least two control instructions during the configuration of the remote control device, such that the at least two control instructions have a preset order. For example, the terminal may transmit the preset order to the remote control device by carrying it in the setting instruction. In one possible implementation, the terminal may add an instruction sequence number for each control instruction in the setting instruction, and the instruction sequence number is used to indicate the order of the control instruction arranged in the at least two control instructions.

In the case of using an infrared control instruction as the control instruction, the setting instruction for each control instruction may be expressed, for example, in the following manner to reflect the ordering of each control instruction. The following illustrates the case of two control instructions:

{"method": "set_ir_seq", "params":{"seq_id": "123456", "current":1, "freq": "xxx", "head": "xxx", "code": "xxxx"}}

{"method": "set_ir_seq", "params":{"seq_id": "123456", "current":2, "freq": "xxx", "head": "xxx", "code": "xxxx"}} wherein "current" indicates the ordering of this piece of control instruction, "current": 1 means the ordering is 1, and "current": 2 means the ordering is 2.

Further, in order to make the remote control device explicitly know the total number of the at least two control instructions, so as to determine whether or not the setting of the control instruction is successful, the terminal may also carry the total number of the at least two control instructions in the setting instruction so that when the number of the received control instructions is equal to the total number, the remote control device determines that the setting is successful. In the case where the control instruction is an infrared control instruction, the setting instruction of each control instruction may be expressed, for example, in the following manner to reflect the total number of the control instructions:

{"method": "set_ir_seq", "params":{"seq_id": "123456", "total":2, "current":1, "freq": "xxx", "head": "xxx", "code": "xxxx"}}

{"method": "set_ir_seq", "params":{"seq_id": "123456", "total":2, "current":2, "freq": "xxx", "head": "xxx", "code": "xxxx"}} wherein "total" indicates the total number of the control instructions, and "total":2 indicates that the total number is 2.

It should be noted that the setting instruction may contain both the instruction sequence numbers of the control instructions and the total number of at least two control instructions.

In step 506, the remote control device stores the at least two control instructions and the instruction set identifier in a preset instruction list according to the received setting instruction.

After receiving the setting instruction, the remote control device parses the control instructions and the instruction set identifier from the setting instruction, and stores the parsed control instructions and instruction set identifier in the preset instruction list correspondingly. In the preset instruction list, the remote control device may use the instruction set identifier as an index to store the control instructions locally.

In another embodiment, if the setting instruction also includes a preset order of the at least two control instructions, the remote control device may, after receiving the setting instruction of the control instruction from the terminal, store the at least two control instructions corresponding to the instruction set identifier in the preset instruction list according to the preset order. In one implementation, when storing the control instructions in the preset order, a corresponding instruction sequence number may be stored for each control instruction.

Further, if the setting instruction also includes the total number of at least two control instructions, the remote control device may store the total number corresponding to the instruction set identifier in the preset instruction list. The remote control device may determine whether the setting procedure of the control instruction is successful according to the received total number of the control instructions, and the process may be as follows, in example implementations:

If the remote control device does not receive a next setting instruction within a preset time after receiving one setting instruction, it is determined whether or not the number of the received control instructions has reached the total number. If the number has reached the total number, it is determined that the setting is successful and a setting success result is fed back to the terminal. If the number has not reached the total number, it is determined that the setting fails and a setting failure result is fed back to the terminal so that the terminal re-executes the setting procedure after receiving the setting failure result. That is, the setting instruction is resent to the remote control device. The process of re-executing the setting may be performed automatically by the terminal or may be performed by the terminal in response to a selection by the user. The present disclosure is not particularly limited thereto.

It should be noted that, in the process of sending the setting instruction to the remote control device by the terminal, it is likely that the setting instruction is lost due to the unstable network or other factors, and in such case, the remote control device cannot receive all the setting instructions. When the remote control device determines that the setting fails, if the setting instruction contains both the instruction sequence numbers of the control instructions and the total number of the at least two control instructions, the remote control device may also determine the instruction sequence number of the control instruction that has not been successfully received, and send the instruction sequence number of the control instruction that has not been successfully received back to the terminal, so that the terminal only needs to re-send the setting instruction containing the control instruction which has not been successfully received to the remote control device, thereby improving the setting efficiency of the control instruction and reducing the power consumption of the terminal. The process of re-sending the setting instruction may be executed automatically by the terminal or may be performed by the terminal according to in response to selection by the user. The present disclosure is not particularly limited thereto.

The above steps 504 to 506 are a process in which the terminal configures a binding relationship between a custom key and a plurality of control instructions of at least one home device in a remote control device. After the configuration is successful, the terminal may control one home device to perform multiple operations based on selection of the custom key, or jointly control multiple home devices. The specific procedure may be referred to steps 507 to 511.

In step 507, the terminal displays a control key interface, which includes at least the custom key.

This step is the same as the above step 403 and will not be repeated here.

In step 508, when a selection of the custom key is detected, the terminal sends a custom control message to the remote control device, the custom control message containing the instruction set identifier.

When the terminal detects selection of the custom key, the terminal obtains the instruction set identifier stored corresponding to the key identifier of the custom key, that is, obtains the instruction set identifier associated with the custom key, and then determines at least two control instructions associated with the custom key.

The terminal generates a custom control message containing the instruction set identifier, and sends the custom control message to the remote control device via the connection established with the remote control device, that is, sends the instruction set identifier contained in the custom control message to the remote control device. Since the terminal sends the custom control message for the purpose of causing the remote control device to transmit multiple control signals to control one or more home devices, in order to be distinguished from the setting instruction of the terminal, the custom message may also carry a playback identifier of the control instruction, and the playback identifier is used for instructing the remote control device to transmit the control signal based on the received instruction set identifier.

For example, the custom control message may have the following format:

{"method": "ir_play_seq", "seq_id":123456} wherein "ir_play_seq" represents the playback identifier, and "seq_id" is used to indicate the instruction set identifier.

It should be noted that, in practical applications, the playback identifier and the instruction set identifier may be expressed in other ways, and the present disclosure is not particularly limited thereto.

In step 509, the remote control device acquires the instruction set identifier from the custom control message, and acquires at least two control instructions corresponding to the instruction set identifier from the stored preset instruction list.

After obtaining the instruction set identifier, the remote control device may obtain at least two control instructions corresponding to the instruction set identifier from the preset instruction list by using the instruction set identifier as the index.

In step 510, the remote control device transmits at least two control signals according to the at least two control instructions.

This step is the same as step 405 described above and will not be repeated here.

When the at least two control instructions have a preset order, the process of transmitting at least two control signals by the remote control device may be as follows in example implementations.

For example, a control signal may be generated for each control instruction in accordance with a preset order of each control instruction. Then, the control signal for each control instruction may be transmitted.

For example, when the instruction sequence number is stored in the preset instruction list corresponding to each control instruction, the remote control device may determine the preset order of the at least two control instructions according to the instruction sequence number corresponding to each control instruction in the preset instruction list. The remote control device may transmit each control signal in sequence according to the preset order after generating at least two control signals in the preset order. Or the remote control device may transmit one control signal after generating one control signal in accordance with the preset order, and then immediately after generating a next control signal, transmit the next control signal, and so on, to complete the transmission process of the at least two control signals.

In step 511, each home device in the at least one home device performs a corresponding control operation based on the received control signal.

This step is the same as the above step 406, and will not be described again.

The following example shows how to jointly control a plurality of home devices by the terminal via one key in FIG. 5. For example, explanations are given by taking jointly controlling the TV and set-top box by the terminal via one key as an example.

For example, if the custom key is associated with the turn-on control instruction of the TV and the turn-on control instruction of the set-top box, when the user clicks or taps the custom key, the terminal sends an instruction set identifier "123456" of the turn-on control instruction of the TV and the turn-on control instruction of the set-top box to the remote control device. Since the remote control device stores the control instructions corresponding to the instruction set identifier "123456" through the configuration by the terminal, the remote control device may locally obtain the turn-on control instruction of the TV and the turn-on control instruction of the set-top box according to the instruction set identifier "123456", and then transmit the turn-on control signal of the TV and the turn-on control signal of the set-top box respectively, such that the TV performs the turn-on operation after receiving the turn-on control signal of the TV, and the set-top box performs the turn-on operation after receiving the turn-on control signal of the set-top box, thereby achieving the purpose of turning on the TV and the set-top box by one key, and simplifying the operation steps of controlling multiple home devices.

Through the method provided by the embodiments of the present disclosure, one key is associated with at least two control instructions of at least one home device, and in this way, the home device can perform a plurality of operations by only operating one key by the user. When at least two control instructions correspond to different home devices respectively, multiple home devices may be jointly controlled through one key, which simplifies the process of controlling the multiple home devices.

Figure 6A:
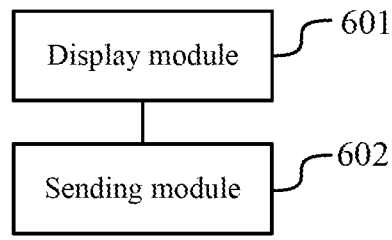
FIG. 6A is a block diagram of an example device control apparatus according to one or more exemplary embodiments.

FIG. 6A is a block diagram of a device control apparatus shown in accordance with an exemplary embodiment. Referring to FIG. 6A, the apparatus includes a display module 601 and a sending module 602.

The display module 601, connected to the sending module 602, is configured to display a control key interface. The control key interface includes at least a custom key. The custom key is used for triggering/configured to trigger a custom control message. The custom control message is used for indicating at least two control instructions associated with the custom key. The at least two control instructions correspond to at least one home device. The sending module 602 is configured to send a custom control message to the remote control device when selection of a custom key is detected so that the remote control device transmits at least two control signals according to the custom control message to control at least one home device.

In one possible implementation, the display module 601 is also configured to display control options available for a custom operation of at least one home device when the custom operation to the custom key (e.g., a user selection to customize which control operations are to be associated with particular custom keys) is detected.

Figure 6B:
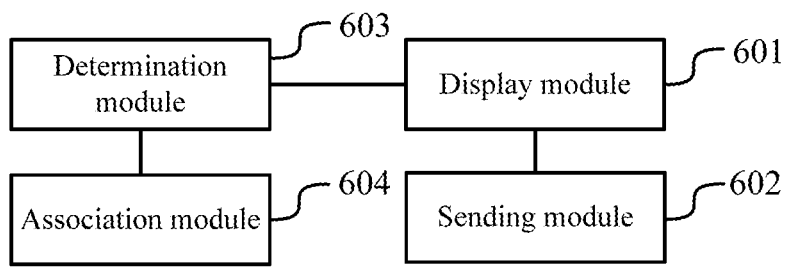
FIG. 6B is a block diagram of an example device control apparatus according to one or more exemplary embodiments.

Referring to FIG. 6B, the apparatus further includes: a determination module 603, and an association module 604.

The determination module 603 is configured to determine at least two control instructions corresponding to at least two control options obtained from the control options available for the custom operation.

The association module 604 is configured to associate the at least two control instructions with the custom key.

In one possible implementation, the custom control message contains the at least two control instructions.

In one possible implementation, the display module 601 is also configured to, when a custom operation to the custom key is detected, display control options available for the custom operation of the at least one home device for the user. The determination module 603 may be configured to determine at least two control instructions based on at least two control options obtained from control options available for the custom operation.

Figure 6C:
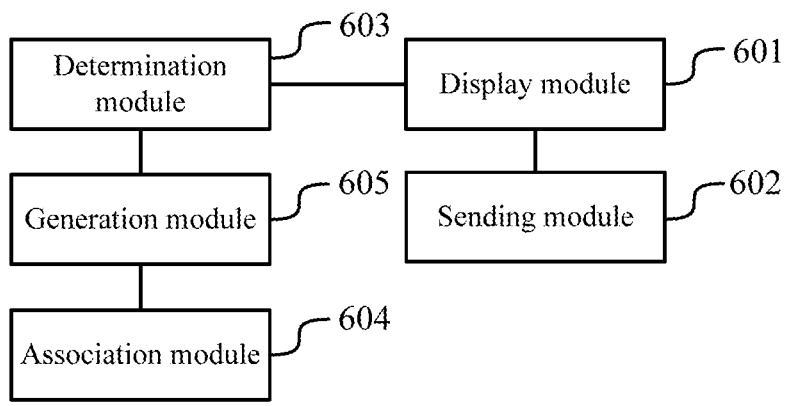
FIG. 6C is a block diagram of an example device control apparatus according to one or more exemplary embodiments.

Referring to FIG. 6C, the apparatus further includes: a generation module 605 and an association module 604.

The generation module 605 is configured to generate an instruction set identifier for at least two control instructions.

The association module 604 is configured to associate the instruction set identifier with the custom key.

In one possible implementation, the custom control message contains an instruction set identifier. The sending module 602 is configured to send the instruction set identifier to the remote control device so that the remote control device acquires at least two control instructions corresponding to the instruction set identifier from the stored preset instruction list to control at least one home device. The preset instruction list is used for storing an instruction set identifier and one or more corresponding control instructions.

In one possible implementation, the generation module 605 is further configured to generate a setting instruction for the control instruction. The setting instruction at least includes the at least two control instructions and the instruction set identifier. The sending module may be further configured to send the setting instruction to the remote control device such that the remote control device stores the at least two control instructions and the instruction set identifiers in the preset instruction list correspondingly.

In one possible implementation, the at least two control instructions have a preset order corresponding, for example, to an order in which corresponding control signals should be transmitted by the remote control device to the at least one home device, and/or corresponding to an order in which corresponding control operations are to be performed by the at least one home device.

Figure 6D:
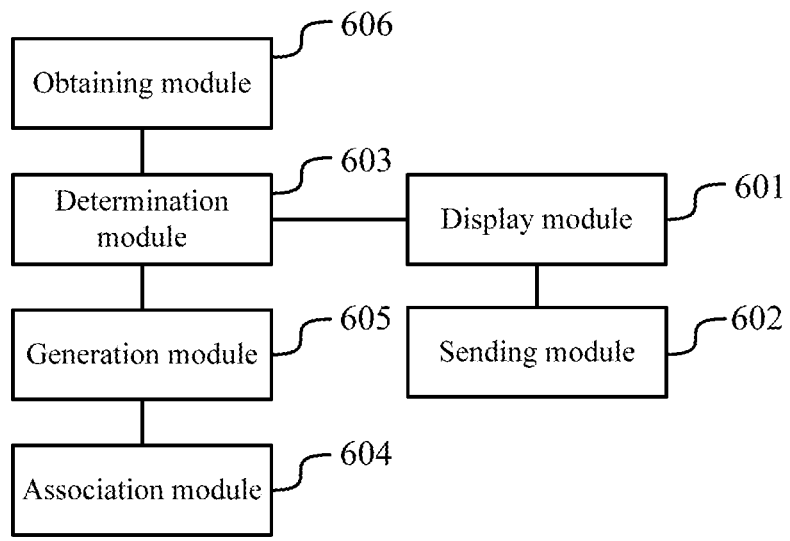
FIG. 6D is a block diagram of an example device control apparatus according to one or more exemplary embodiments.

In one possible implementation, referring to FIG. 6D, the apparatus further includes: an obtaining module 606.

The obtaining module 606 is configured to obtain a control instruction library for each home device in at least one home device from a server. The control instruction library is used for storing a plurality of control instructions of the home device, and each of the plurality of control instructions corresponds to one control option of the home device.

Through the apparatus provided by the embodiment of the present disclosure, one key is associated with at least two control instructions of at least one home device, and in this way, the home device can perform a plurality of operations by having a user operate only one key. When at least two control instructions correspond to different home devices respectively, multiple home devices may be jointly controlled using one key, which simplifies the operational steps involved in controlling multiple devices.

Figure 7A:
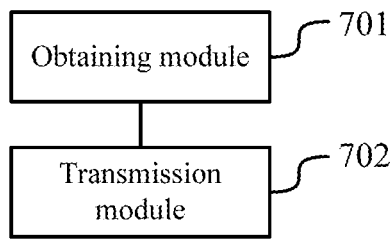
FIG. 7A is a block diagram of an example device control apparatus according to one or more exemplary embodiments.

FIG. 7A is a block diagram of an example device control apparatus according to an exemplary embodiment. Referring to FIG. 7A, the apparatus includes an obtaining module 701 and a transmission module 702.

The obtaining module 701, connected to the transmission module 702, is configured to obtain at least two control instructions based on the received custom control message. The at least two control instructions correspond to at least one home device. The transmission module 702 is configured to transmit at least two control signals according to the at least two control instructions so that each home device in the at least one home device performs a corresponding control operation in accordance with the received control signal.

In one possible implementation, the obtaining module 701 is configured to obtain the at least two control instructions from the custom control message.

In one possible implementation, the obtaining module 701 is configured to obtain an instruction set identifier from the custom control message, and also obtain at least two control instructions corresponding to the instruction set identifier from a stored preset instruction list, where the preset instruction list is used to store an instruction identifier and one or more corresponding control instructions.

Figure 7B:
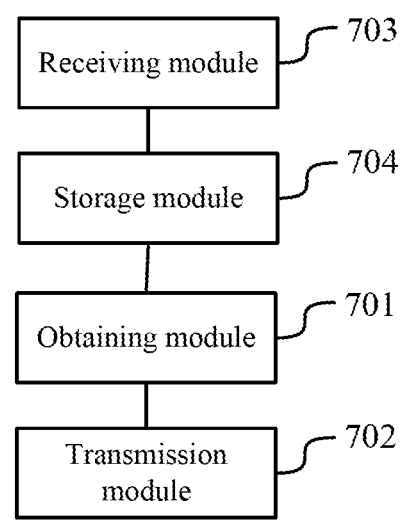
FIG. 7B is a block diagram of an example device control apparatus according to one or more exemplary embodiments.

In one possible implementation, referring to FIG. 7B, the apparatus further includes: a receiving module 703 and a storage module 704.

The receiving module 703 is configured to receive a setting instruction of the control instruction from a terminal, the setting instruction including the at least two control instructions and the instruction set identifier.

The storage module 704 is configured to store the at least two control instructions and the instruction set identifier in the preset instruction list correspondingly.

In one possible implementation, the at least two control instructions have a preset order.

Through the apparatus provided by the embodiment of the present disclosure, one key is associated with at least two control instructions of at least one home device, and in this way, the home device can be controlled to perform multiple operations via one selection of a control by the user. When at least two control instructions correspond to two or more different home devices respectively, control of the two or more different home devices can be achieved using one key, thereby simplifying the control process for users.

With respect to the apparatus in the above embodiment, the specific mode in which each module performs the operation has been described in detail in the embodiment relating to the method, and the description thereof will not be described in detail herein.

Figure 8:
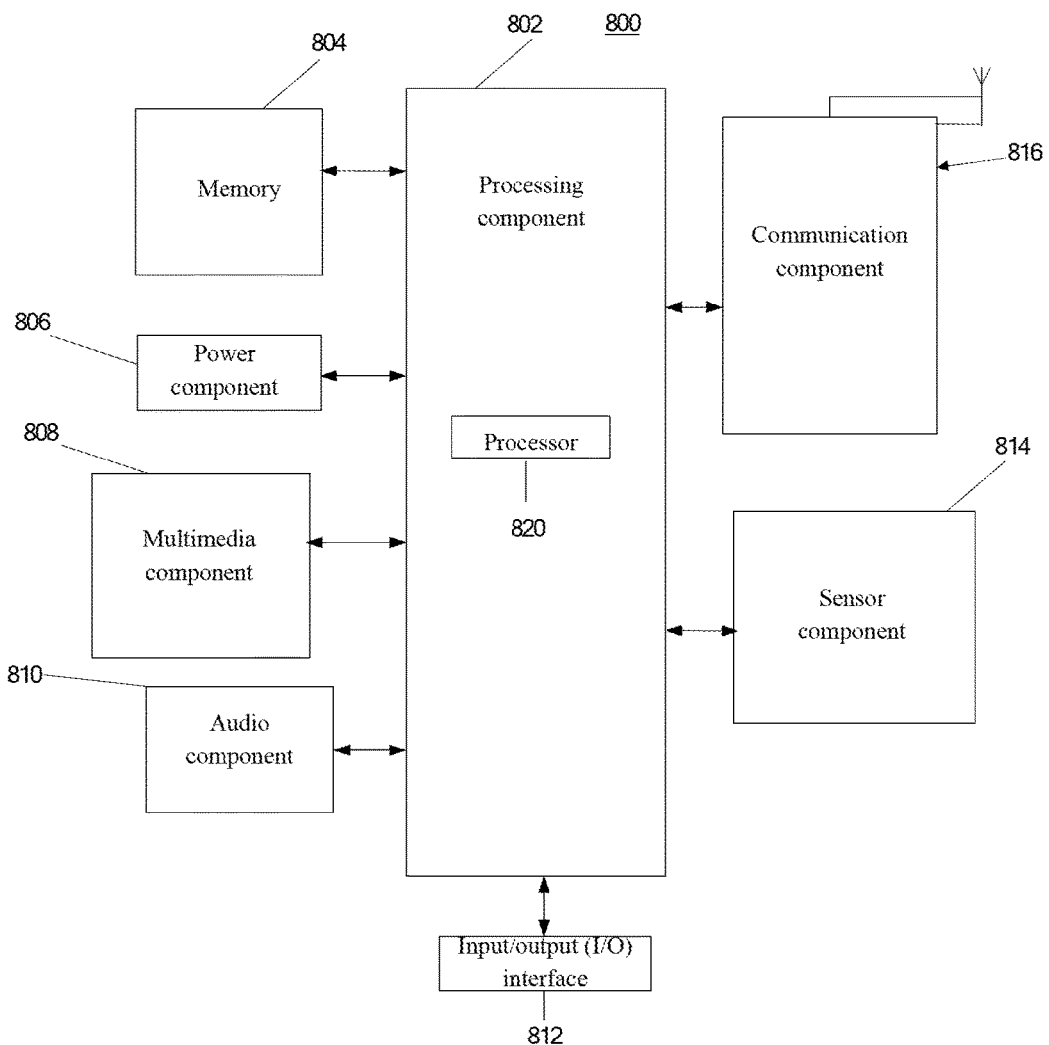
FIG. 8 is a block diagram of an example device control apparatus according to one or more exemplary embodiments.

FIG. 8 is a block diagram of an example device control apparatus provided by an exemplary embodiment. For example, the apparatus 800 may be a mobile phone, a computer, a digital broadcast terminal, a messaging device, a gaming console, a tablet, a medical device, exercise equipment, a personal digital assistant, and the like.

Referring to FIG. 8, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described resource transfer methods.

In exemplary embodiments, there is also provided a non-transitory computer-readable storage medium including instructions, such as the memory 804 including instructions, the above instructions are executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

In exemplary embodiments, there is also provided a non-transitory computer-readable storage medium. When instructions in the storage medium are executed by the processor of the terminal, the terminal may perform the above device control method.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A device control method, comprising:
   accessing, via a terminal, a control instruction library for at least two separate home devices from a server, the control instruction library being used for storing a plurality of control instructions for each of the at least two separate home devices;
   establishing a connection between the terminal and the server, and a connection between the server and a remote control device;
   obtaining, via the terminal, at least two control instructions associated with a custom control message, the at least two control instructions being configured to control the at least two separate home devices to perform at least two operations, the at least two operations including at least one operation on each of the home devices;
   accepting, via a control key interface displayed at the terminal, a selection of one single custom key corresponding to the two or more operations by the at least two separate home devices;
   providing, in response to the selection of the custom key at the terminal, the custom control message to the remote control device;
   generating, by the remote control device, at least two control signals corresponding to the at least two control instructions in accordance with a preset order of the control instructions; and
   transmitting simultaneously via the remote control device in communication with the terminal upon reception of the custom control message, the at least two control signals to cause the at least two separate home devices to perform, simultaneously, at least two corresponding control operations in response to the received control signals;
   wherein the server further stores identifiers of the home devices correspondingly with the control instruction library.

2. The method according to claim 1, wherein the obtaining at least two control instructions associated with the custom control message comprises:
   obtaining the at least two control instructions from the custom control message.

3. The method according to claim 1, wherein the obtaining at least two control instructions associated with the custom control message comprises:

obtaining an instruction set identifier from the custom control message; and obtaining at least two control instructions corresponding to the instruction set identifier from a stored preset instruction list, the preset instruction list being used for storing an instruction identifier and one or more corresponding control instructions.

4. The method according to claim 3, wherein before obtaining the at least two control instructions associated with the custom control message, the method further comprises:

receiving a setting instruction associated with the terminal, the setting instruction comprising the at least two control instructions and the instruction set identifier; and storing the at least two control instructions and the instruction set identifier in the preset instruction list correspondingly.

5. The method according to claim 1, wherein the at least two control instructions have a preset order corresponding to a sequence in which the at least two operations will be performed by the at least two separate home devices.

6. The method of claim 1, wherein the two control signals transmitted by the remote control device are configured to cause the at least two separate home devices to perform, simultaneously, at least two corresponding control operations in response to the received control signals.

7. A device control method, comprising:

accessing, via a terminal, a control instruction library for at least two separate home devices from a server, the control instruction library being used for storing a plurality of control instructions for each of the at least two separate home devices;

establishing a connection between the terminal and the server, and a connection between the server and a remote control device;

displaying, via the terminal, a control key interface, the control key interface comprising one single custom key configured, when selected, to trigger a custom control message, the custom control message being used for indicating at least two control instructions associated with the custom key, and the at least two of the plurality of control instructions being configured to instruct the at least two separate home devices to perform at least two operations, the at least two operations including at least one operation on each of the home devices; and when selection of the custom key is detected, sending, via the terminal, the custom control message to the remote control device; generating, by the remote control device, at least two control signals corresponding to the at least two control instructions in accordance with a preset order of the control instructions; and transmitting simultaneously via the remote control device the at least two control signals corresponding to the at least two control instructions of the custom control message, the at least two control signals being configured to control the at least two separate home devices to perform, simultaneously, the at least two operations;

wherein the server further stores identifiers of the home devices correspondingly with the control instruction library.

8. The method according to claim 7, wherein before selection of the custom key is detected, the method further comprises:

when a custom operation for the custom key is detected, displaying control options available for operation of the at least two separate home devices;

accepting selection of at least two control operations for the at least two separate home devices;

determining the at least two control instructions corresponding to the at least two control options selected by the user; and associating the at least two control instructions with the custom key.

9. The method according to claim 8, wherein the custom control message comprises the at least two control instructions corresponding to the selected control options.

10. The method according to claim 7, wherein before selection of the custom key is detected, the method further comprises:

when a custom operation for the custom key is detected, displaying control options available for operation of the at least two separate home devices;

determining the at least two control instructions corresponding to at least two control options selected by a user from the control options available for the custom operation;

generating an instruction set identifier for the at least two control instructions; and associating the instruction set identifier with the custom key.

11. The method according to claim 10, wherein the custom control message comprises the instruction set identifier, and the sending the custom control message to the remote control device comprises:

sending the instruction set identifier to the remote control device such that the remote control device retrieves the at least two control instructions corresponding to the instruction set identifier from a stored preset instruction list to control the at least two separate home devices, the preset instruction list being used for storing an instruction set identifier and one or more corresponding control instructions.

12. The method according to claim 10, wherein after associating the instruction set identifier with the custom key, the method comprises:

generating a setting instruction of the control instruction, the setting instruction at least comprising the at least two control instructions and the instruction set identifier; and sending the setting instruction to the remote control device so that the remote control device stores the at least two control instructions and the instruction set identifier in the preset instruction list correspondingly.

13. The method according to claim 7, wherein the at least two control instructions have a preset order in which selected control options will be performed by the at least two separate home devices.

14. A device control apparatus, comprising:

a processor; and a memory for storing instructions executable by the processor;

wherein the processor is configured to:

access a control instruction library for at least two separate home devices from a server, the control instruction library being used for storing a plurality of control instructions for each of the at least two separate home devices, and the control instruction library being stored with identifiers of the home devices correspondingly;

establish a connection between a terminal and the server, and a connection between the server and the device control apparatus;

obtain at least two of the plurality of control instructions corresponding to a custom control message, the at least two of the plurality of control instructions being configured to instruct the at least two separate home devices to perform two or more operations, the two or more operations including at least one operation on each of the home devices;

generate at least two control signals corresponding to the at least two control instructions in accordance with a preset order of the control instructions; and transmit simultaneously, in response to selection of one single custom key, the at least two control signals to cause the at least two separate home devices to perform, simultaneously, two or more corresponding control operations in response to the received control signals.

15. The apparatus according to claim 14, wherein the processor is further configured to obtain the at least two of the plurality of control instructions from the custom control message.

16. The apparatus according to claim 14, wherein the processor is further configured to obtain an instruction set identifier from the custom control message; and obtain at least two of the plurality of control instructions corresponding to the instruction set identifier from a stored preset instruction list, the preset instruction list including an instruction identifier and one or more corresponding control instructions.

17. The apparatus according to claim 16, wherein the processor is further configured to:

receive a setting instruction of the control instruction of the terminal, the setting instruction at least comprising the at least two of the plurality of control instructions and the instruction set identifier; and store the at least two of the plurality of control instructions and the instruction set identifier in the preset instruction list correspondingly.

18. The apparatus according to claim 17, wherein the at least two of the plurality of control instructions have a preset order in the at least two control options will be performed by the at least two separate home devices.

19. The apparatus of claim 14, wherein the at least two of the plurality of control instructions are configured to instruct the at least two separate home devices to perform two or more operations, and wherein the at least two control signals corresponding to the at least two of the plurality of control instructions are transmitted to the at least two separate home devices to cause each of the at least two separate home devices to perform, simultaneously, two or more corresponding control operations corresponding to the received control signals.

* * * * *